United States Patent [19]
Raghu et al.

[11] Patent Number: 5,935,350
[45] Date of Patent: Aug. 10, 1999

[54] HARDFACING METHOD AND NICKEL BASED HARDFACING ALLOY

[75] Inventors: Damodaran Raghu, Elkhart; Martin E. Lohrman, Goshen, both of Ind.

[73] Assignee: Deloro Stellite Company, Inc, St, Louis, Mo.

[21] Appl. No.: 08/790,630

[22] Filed: Jan. 29, 1997

[51] Int. Cl.$^6$ .................................................. B32B 15/18
[52] U.S. Cl. ........................ 148/427; 420/442; 428/479
[58] Field of Search .................................. 428/937, 553, 428/546, 479; 148/410, 427, 419, 442; 420/585, 454, 441, 442

[56] References Cited

U.S. PATENT DOCUMENTS

| | | | |
|---|---|---|---|
| 3,836,341 | 9/1974 | Sattzman et al. | 164/119 |
| 4,034,588 | 7/1977 | Way et al. | 420/585 |
| 4,064,608 | 12/1977 | Jaeger | 428/679 |
| 4,075,999 | 2/1978 | Danis | 123/191 |
| 4,093,454 | 6/1978 | Saito et al. | 75/236 |
| 4,113,920 | 9/1978 | Helton et al. | 428/565 |
| 4,118,254 | 10/1978 | Knotek et al. | 148/32 |
| 4,130,420 | 12/1978 | Firnhaber | 75/134 |
| 4,181,523 | 1/1980 | Bhansali . | |
| 4,191,562 | 3/1980 | Silence . | |
| 4,192,983 | 3/1980 | Paoletti | 219/76.1 |
| 4,216,015 | 8/1980 | Hickl et al. . | |
| 4,272,289 | 6/1981 | Herchenroeder et al. | 420/585 |
| 4,425,300 | 1/1984 | Teramoto et al. | 420/585 |
| 4,430,297 | 2/1984 | Crook | 420/442 |
| 4,590,035 | 5/1986 | Veda et al. | 420/449 |
| 4,766,042 | 8/1988 | Otani | 420/441 |
| 5,328,763 | 7/1994 | Terry | 428/559 |

OTHER PUBLICATIONS

Raghu et al., PTA Proves Its Worth in High–Volume Hardfacing Jobs, Welding Journal, Feb. 1996, pp. 34–40.

*Primary Examiner*—Melvyn Andrews
*Attorney, Agent, or Firm*—Senniger, Powers, Leavitt & Roedel

[57] ABSTRACT

A nickel based hardfacing alloy having the following elemental constituents, by weight: Cr, 16–22%; Mo, 1–7%; Si, 2.5–3.7%; C, 0.8–1.4%; B, 2–3%; Fe, 2–3.9%; Co, 4.3–17%; Ni and incidental impurities, balance. The alloy is in gas-atomized powder form suitable for deposition by plasma transferred arc welding, has a hardness in the range of about 50 Rc to 60 Rc, a coefficient of friction in the range of about 0.12 to 0.13, an ASTM G-65 wear rating in the range of about 20 to 26, and an ASTM G-77 wear rating in the range of about 0.0 to 0.074. A method of enhancing the abrasive wear resistance and metal-to-metal wear resistance of a substrate by welding a Ni based alloy having at least 40% Ni by weight, between 4% and 18% Co by weight, and between 2% and 3% B, onto wear surfaces of the substrate as a coating having a thickness between about 0.025 in. and about 0.5 in. A plastic extruder screw comprising a metallic body having screw flights and a coating on the screw flights, which coating is between about 0.025 in. and 0.5 in. thick, and is a Ni based alloy having between 4% and 18% Co by weight and between 2% and 3% B by weight.

11 Claims, 2 Drawing Sheets

HARDFACING METHOD AND NICKEL BASED HARDFACING ALLOY

BACKGROUND OF THE INVENTION

This invention relates to a nickel based hardfacing alloy and to a method of hardfacing substrates.

"Hardfacing" is a technique which involves applying a layer of hard material to a substrate for the purpose of increasing the wear and corrosion resistance of the substrate. The use of this technique has increased significantly over the years as industry has come to recognize that substrates of softer, lower cost material can be hardfaced to have the same wear and corrosion resistance characteristics as more expensive substrates of a harder material.

Hardfacing involves the deposition of a hard layer by welding or thermal spraying. Conventional weld hardfacing is accomplished by oxyfuel welding (OFW), gas tungsten arc welding (GTAW), gas metal arc welding (GMAW), shielded metal arc welding (SMAW) and flux-cored arc welding (FCAW). Plasma transferred arc (PTA) hardfacing and laser beam hardfacing are also employed.

Substrates such as plastic extruder screw flights have been hardfaced with a variety of Ni based and Co based alloys to combat abrasive wear due to various plastic fillers and due to metal-to-metal wear between the extruder screw flights and hard surfaces with which they are in contact in service. To reduce abrasive wear, it is desirable to use hardfacing materials which have relatively low coefficients of friction. It is also desirable to use hardfacing materials having good corrosion resistance in view of acid release during placticizing. Such materials should also have good weldability and crack resistance.

Hardfacing materials have also included High Velocity Oxygen Fuel Thermal Spray process-fused coatings of Ni—Co—B—Si—WC, which have good abrasive wear characteristics. But such coatings are disadvantageously limited to a thickness of less than about 0.01 inch, and their relatively high hardness results in wear to mating material.

Hardfacing materials have further included PTA-applied Ni—Cr—B—Si alloys and Co—Cr—W—C alloys. The Ni—Cr—B—Si alloys have good abrasive wear resistance, but are crack sensitive at hardnesses greater than about Rc-50 and provide insufficient metal-to-metal wear resistance. The Co—Cr—W—C alloys have good adhesive wear resistance and weldability, but are relatively expensive and have relatively poor abrasive wear resistance.

Still further hardfacing materials have included nitrided low alloy or precipitation hardenable steels, which have good wear characteristics but suffer in the areas of thickness limitation, corrosion resistance, and repair weldability.

Relatively small extruder screws (less than about 1.5 in. diameter) have traditionally not been hardfaced but manufactured from proprietary tool steels such as CPM-9V and CPM-10V, but due to their relatively poor toughness, such steels are not suited for use on relatively large substrates, such as screws having a length of greater than about 1.5 inches.

SUMMARY OF THE INVENTION

Among the several objects of the invention, therefore, is to provide a hardfacing alloy having improved abrasive wear resistance, improved metal-to-metal wear resistance, reduced coefficient of friction, improved weldability, especially by the PTA technique, and improved crack resistance during and after welding onto substrates.

Briefly, therefore, the invention is directed to a nickel based hardfacing alloy having improved wear resistance comprising at least about 40% Ni by weight, between about 4% and 18% Co by weight, and between about 1.5% and 3.5% B by weight.

The invention is further directed to a nickel based hardfacing alloy having improved wear resistance comprising, by weight:

| | |
|---|---|
| Cr | 16–22% |
| Mo | 1–7% |
| Si | 2.5–3.7% |
| C | 0.8–1.4% |
| B | 2–3% |
| Fe | 2–3.9% |
| Co | 4.3–17% |
| Ni | Balance |

Another aspect of the invention is a nickel based hardfacing alloy having improved wear resistance consisting essentially of, by weight:

| | |
|---|---|
| Cr | 16–22% |
| Mo | 1–7% |
| Si | 2.5–3.7% |
| C | 0.8–1.4% |
| B | 2–3% |
| Fe | 2–3.9% |
| Co | 4.3–17% |
| Ni | Balance |

This alloy is in gas-atomized powder form suitable for deposition by plasma transferred arc welding and has a hardness in the range of about 50 Rc to 60 Rc, a coefficient of friction in the range of about 0.12 to 0.13, an ASTM G-65 wear rating in the range of about 20 to 26, and an ASTM G-77 wear rating in the range of about 0.0 to 0.074.

In another aspect the invention is directed to a method of enhancing the abrasive wear resistance and metal-to-metal wear resistance of a substrate. The method involves welding a Ni based alloy comprising at least about 40% Ni by weight, between about 4% and 18% Co by weight, and between about 1.5% and 3.5% B, onto wear surfaces of the substrate as a coating having a thickness between about 0.03 in. and about 0.5 in., preferably between about 0.03 in. and about 0.1 in.

In still another aspect the invention is directed to a plastic extruder screw comprising a metallic body having screw flights and a coating on the screw flights, said coating being between about 0.03 in. and about 0.5 in., preferably between about 0.03 in. and about 0.1 in. thick, and said coating further being Ni based and comprising between about 4% and 18% Co by weight and between about 1.5% and 3.5% B by weight.

Other objects and features of the invention will be in part apparent and in part pointed out hereinafter.

DETAILED DESCRIPTION OF THE INVENTION

Figure 1:
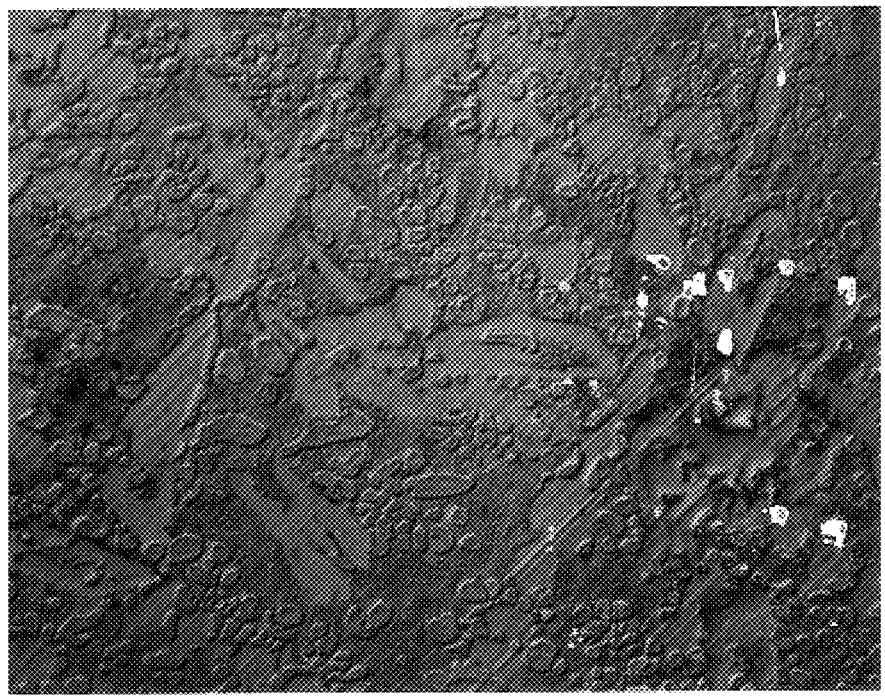
FIG. 1 is a photomicrograph of an alloy of the invention.

The alloy of the invention is a Ni based hardfacing alloy having a Co content of between about 4% and 18%, preferably between about 4.3% and 17%. All constituent percentages in this application refer to percentages by weight unless stated otherwise. Cobalt is used in these selected amounts to reduce stacking fault energy, which enhances improve galling resistance and metal-to-metal wear resistance. Cobalt contents significantly above about 17% are avoided due to Co's scarcity and expense, and to avoid impairment of the fluidity of the alloy, as Co tends to increase the melting point of the alloy. It is important to maintain fluidity, as this is a requirement for an alloy to be amenable to powder formation, and powders are the preferred alloy form for our PTA welding technique.

The Mo content of the alloy of this invention is a between about 1% and 8%, preferably between about 1% and 7%. Molybdenum is used in these selected amounts to reduce stacking fault energy and coefficient of friction, which reduces wear on mating parts in contact with the hardfaced part. This amount of Mo has also been discovered to provide a measure of protection against corrosion in reducing acids, and improves wear characteristics due to the formation of molybdenum carbides. Molybdenum contents significantly above about 7% are avoided due to Mo's scarcity and expense, and to avoid impairment of the alloys fluidity, as Mo tends to increase the melting point of the alloy. It is important to maintain fluidity, as this is a requirement for an alloy to be amenable to powder formation, and powders are the preferred alloy form for our PTA welding technique.

The Cr content of the alloy of this invention is a between about 15% and 23%, preferably between about 16% and 22%. Chromium is included in these amounts to improve abrasion resistance by forming carbides. Chromium also improves corrosion resistance. Chromium contents significantly above about 22%, and especially of about 30% and greater, are avoided because such contents increase the alloys' tendency to oxidize, and decreases fluidity and amenibility to powder formation.

The C content of the alloy of this invention is a between about 0.8% and 1.5%, preferably between about 0.8 and 1.4%. Carbon is provided in these amounts for carbide formation. Carbon contents significantly above about 1.4% are avoided to avoid embrittlement and cracking problems.

The B content of the alloy of this invention is a between about 2% and 3%. Boron in these amounts improves abrasion resistance due to the formation of chromium and nickel borides. One preferred embodiment of the invention has between 2.61% and 2.92% B. Boron also improves weld fluidity, but disadvantageously increases the propensity of the alloy for liquation cracking, such that amounts significantly above about 3% are avoided.

The Fe content of the alloy of this invention is a between about 2% and 3.9%. Iron is not specifically added to the alloy for any advantages it may provide, but is tolerated in amounts up to about 4%, and is in fact incorporated into the alloy due to its low cost. Iron contents significantly above this range, and particularly above about 8–10%, are avoided to avoid iron's adverse impact on metal-to-metal wear resistance.

The Si content of the alloy of this invention is between about 2% and 4%, preferably between about 2.5% and 3.7%. Silicon is included in these amounts to improve weldability and increase wear resistance due to the formation of nickel silicides. The Si content is maintained below about 4.0% to prevent significant reductions in toughness.

The balance (at least about 40%) of the alloy is nickel, with a minor amount of incidental impurities being tolerable, including P and S being tolerable in amounts up to about 0.01%. Nickel provides a tough, impact resistant matrix, and fosters the formation of wear resistant nickel silicides. Nickel also provides resistance to stress corrosion cracking in chloride and fluoride media.

The alloys of the invention are formulated to have hardnesses in the range of 45–65 Rc, preferably 50–60 Rc, more preferably 52–58 Rc, such that they have desirable wear resistance without imparting excessive wear to mating parts.

The invention further involves the deposition of the hardfacing alloy described above by a variety of techniques, with PTA welding being the preferred deposition method. PTA welding is preferable because a plasma arc is struck between a nonconsumable thoriated tungsten cathode and the workpiece, resulting in greater energy transfer to the workpiece. Other suitable electrodes include those containing, for example, Ce, Y or Zr rather than Th. The plasma arc has a high arc density due to the collimated nature of the plasma beam, corresponding to higher energy concentrations and higher arc temperatures than are achieved by other techniques. This beam has high directional stability so that it is not deflected by external magnetic or electrical fields. Consequently, it is preferred over GTAW beams which have less directional stability.

In the preferred PTA welding technique an inert gas having a high ionization energy is directed around the cathode and ionized such that it expands and accelerates and forms a high-energy arc. The ionized plasma also functions as a secondary heat source. A pilot arc is struck as a nontransferred arc between the electrode and a water-cooled constricting orifice to aid the transfer of the main arc and to stabilize the transferred arc at low- and medium-current levels. The cathode is recessed into a nozzle, which collimates and focuses the plasma arc onto the workpiece. The arc is essentially spherical in cross-section and the area of contact is substantially unchanged with minor changes in standoff distance.

With specific regard to the gases used in PTA hardfacing, there is an inner gas flow, also known as plasma gas or center gas, which is preferably argon. This plasma gas helps to generate the plasma and protect the thoriated tungsten electrode. There is also an outer gas, or shielding gas, which provides an inert blanket over the weld pool to protect it from oxidation and contamination. This outer gas is preferably argon. There is also a third gas flow system is used to deliver the hardfacing consumable, in metallic powder form, to the workpiece. The delivery gases are preferably argon, helium, or a mixture of argon with 5% hydrogen. Metallic powders of the compositions described above are carried into the hot plasma and to the workpiece by delivery gas through precise metering mechanisms, preferably a metering wheel, in predetermined quantities.

Among the advantages of PTA hardfacing are that due to its automated nature, less welder dexterity and skills are required; it is amenable to complete robotic automation; and it facilitates precise metering of metallic powder feed, so as to ensure economic utilization of strategic Co and Ni materials such as cobalt and nickel. Furthermore, PTA deposits tend to have few discontinuities, such that the need for rework of rejected workpieces is relatively low, and the smooth deposits of the process significantly reduce the amount of postweld machining required. PTA hardfacing employs powders, which are easy to handle and can be readily blended to form specifically desired alloy compositions.

PTA hardfacing advantageously involves precise control parameters such as powder feed rate, gas flow rate, amperage, voltage and travel speed (heat input), which facilitates a high degree of finished product consistency. Precise control of heat input allows control of weld dilution (primarily by Fe if Co based alloys are used) to 5% to 7% in most cases. This results in lower weld layer thickness (and reduced material consumption) to achieve desired weld deposit properties. Precise control of heat input also helps regulate the size and hardness of the heat-affected zone, which otherwise becomes crack sensitive due to grain coarsening, martensitic transformation or strain aging, and helps regulate the degree of sensitization in stainless steels. PTA deposits are generally tougher and more corrosion resistant than counterparts laid down by the GTAW or OFW processes, due to the fine carbide and dendritic structure of the PTA deposits. PTA deposits also generally have low levels of inclusions, oxides and discontinuities.

Further illustration of the invention is provided by the following examples:

EXAMPLE 1

Nickel based hardfacing alloy test samples were prepared having the following compositions, by weight percent, and were determined to have the following hardness ratings (Rockwell C):

| | Alloy # | | | | | |
|---|---|---|---|---|---|---|
| | 1 | 2 | 3 | 4 | C1 | C2 |
| Cr | 16.64 | 18.43 | 20.22 | 22.01 | 13.0 | 17.5 |
| Mo | 1.77 | 3.56 | 5.30 | 7.07 | — | — |
| Si | 3.77 | 3.38 | 3.00 | 2.60 | 3.5 | 6.8 |
| C | 0.88 | 1.06 | 1.24 | 1.41 | 0.6 | 0.3 |
| B | 2.91 | 2.62 | 2.32 | 2.03 | 2.5 | 1.0 |
| Fe | 3.90 | 3.56 | 3.18 | 2.80 | 4.0 | 5.5 |
| Co | 4.30 | 8.77 | 13.16 | 17.54 | — | — |
| W | — | — | — | — | — | 1.0 |
| Ni | Bal | Bal | Bal | Bal | Bal | Bal |
| Rc | 58 | 48 | 53 | 51 | 55 | 45 |

Alloys 1, 2, 3 and 4 are alloys of the invention. Alloys C1 and C2 are alloys currently in commercial use for plastic extruder screw and other hardfacing applications. Alloys C1 and C2 are available from Stoody Deloro Stellite, Inc of Goshen, Ind. under the designations Deloro®-55 and Nucalloy®-488, respectively. Alloys 1, 3, 4, C1 and C2 were evaluated using the ASTM G-65 rubber wheel abrasion test, which simulates abrasion from plastic filler media. A higher rating indicates lower wear resistance. The abrasion ratings (measured as volume loss in cubic centimeters) of Alloys 1, 3 and 4 were determined to be 25.92, 23.28 and 20.75, respectively, demonstrating excellent abrasion resistance in applications such as plastic extruder screw hardfacing. The abrasion ratings of comparative alloys C1 and C2 were determined to be 31.78 and 66.33, respectively.

From these data it is evident that the alloys of the invention significantly outperform existing alloys in terms of abrasive wear resistance. These improvements are thought to be due to balanced additions of Co, Mo and C to the inventive alloys.

EXAMPLE 2

Alloys 1, 3, 4, C1 and C2 from Example 1 were evaluated using the ASTM G-77 block-on-ring test, which simulates metal-to-metal wear between a hardfaced plastic extruder screw and barrel liner and rates the wear resistance of the hardfacing material, as determined by material loss on a hardfaced block rubbed against a hardened steel ring. This test also rates the wear on the barrel liner as determined by the material loss on hardened steel ring. A higher rating indicates lower wear resistance. The hardfaced material wear ratings (measured as volume loss in cubic centimeters) of Alloys 1, 3 and 4 were determined to be 0.073, 0.024 and 0.0, respectively. The wear ratings on the mating material were determined to be 0.08, 0.11 and 0.01, as resulting from wear against Alloys 1, 3 and 4, respectively. From this data the coefficients of friction for Alloys 1, 3 and 4 were determined to be 0.125, 0.129 and 0.139, respectively. These data are indicative of excellent metal-to-metal wear resistance in applications such as plastic extruder screw hardfacing. The comparative alloys C1 and C2 were determined to have wear ratings of 0.036 and 0.024, and coefficients of friction of 0.13 and 0.125, respectively.

From these data and the Example 1 data it is evident that the alloys of the invention compare favorably to existing alloys in terms of metal-to-metal wear resistance and abrasion resistance.

EXAMPLE 3

Figure 3:
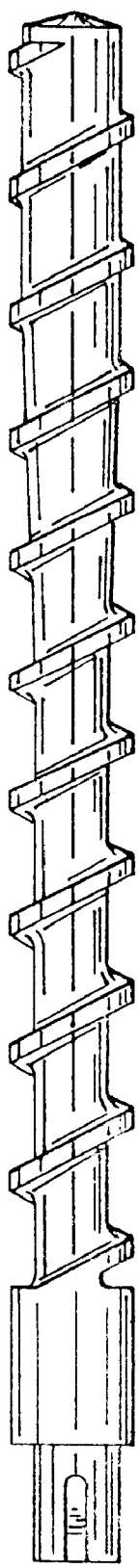
FIG. 3 is an illustration of a plastic extruder screw.

Alloy 4 from Example 1 in gas atomized powder form was welded onto new plastic extruder screws to evaluate its weldability. The screw material was AISI 4140 low alloy steel and the screw diameter was 45 mm. A schematic representation of the extruder screw is presented in FIG. 3. The alloy powder size was between 325 mesh and 80 mesh (45–180 microns) in diameter. The screws were preheated to 780–925° F. and maintained at that temperature by a manifold burner. The welding technique was PTA welding using argon as the carrier, plasma, and shield gases. The welding current was 100 amps and the welding voltage was 24 volts. Two layers were deposited leaving a total deposit thickness of 0.090 inches. The screws were slow-cooled in vermiculite.

The alloy welded with ease, as good as or better than conventional Ni—Cr—B—Si alloys and Co—Cr—W—C alloys, leaving a smooth deposit with no cracks.

EXAMPLE 4

Alloy 4 from Example 1 in gas atomized powder form was welded onto used plastic extruder screws to evaluate its weldability. The screw material was AISI 4140 low alloy steel with a Ni—Cr—B—Si hardfacing overlay (Rc-55) which had become cracked in service, and the screw diameter was 70 mm. The alloy powder size was between 325 mesh and 80 mesh (45–180 microns) in diameter. The screws were preheated to 780–925° F. and maintained at that temperature by a manifold burner. The welding technique was PTA welding using argon as the carrier, plasma, and shield gases. The welding current was 100 amps and the welding voltage was 24 volts. Two layers were deposited leaving a total deposit thickness of 0.090 inches. The screws were slow-cooled in vermiculite.

The alloy welded with ease, as good as or better than conventional Ni—Cr—B—Si alloys and Co—Cr—W—C alloys, leaving a smooth deposit with no cracks. The new hardfacing layer showed several cracks after deposition, all emanating from existing cracks in the in the Ni based overlay. No new cracks were observed. All cracks emanating from the existing overlay were observed to be longitudinal (perpendicular to the welding direction and parallel to the screw axis), which is tolerable for extruder screw applications.

EXAMPLE 5

Figure 2:
FIG. 2 is a photomicrograph of a comparative alloy, not of the invention.

Specimens of Alloy 4 (FIG. 1) and Alloy C1 (FIG. 2) were polished and etched and microstructural photomicrographs were taken at 1000× magnification. Comparison of these two reveals that the alloys of the invention have a more dominant spherical morphology and less dominant elongate/platelet morphology, and thus a more spherical crack-resistant morphology as compared to the acicular morphology of prior Ni—Cr—B—Si alloys.

As various changes could be made in the above embodiments without departing from the scope of the invention, it is intended that all matter contained in the above description shall be interpreted as illustrative and not in a limiting sense.

What is claimed is:

1. A nickel based hardfacing alloy having improved wear resistance comprising at least about 40% Ni by weight, between about 4% and 18% Co by weight, between about 15% and 23% Cr by weight, between about 1% and 7% Mo by weight, and between about 2% and 3% B by weight.

2. A nickel based hardfacing alloy having improved wear resistance comprising approximately, by weight:

| | |
|---|---|
| Cr | 15–23% |
| Mo | 1–8% |
| Si | 2–4% |
| B | 0.8–1.5% |
| Fe | 2–4% |
| Co | 4–18% |
| Ni | Balance. |

3. The alloy of claim 2 consisting essentially of, by weight:

| | |
|---|---|
| Cr | 16–22% |
| Mo | 1–7% |
| Si | 2.5–3.7% |
| C | 0.8–1.4% |
| B | 2–3% |
| Fe | 2–3.9% |
| Co | 4.3–17% |
| Ni | Balance. |

4. The alloy of claim 2 consisting of, by weight:

| | |
|---|---|
| Cr | 16.64% |
| Mo | 1.77% |
| Si | 3.77 |
| C | 0.88% |
| B | 2.91% |
| Fe | 3.9% |
| Co | 4.3% |
| Ni and incidental impurities - Balance. | |

5. The alloy of claim 3 consisting of, by weight:

| | |
|---|---|
| Cr | 18.43% |
| Mo | 3.56% |
| Si | 3.38% |
| C | 1.06% |
| B | 2.62% |
| Fe | 3.56% |
| Ca | 8.77% |
| Ni and incidental impurities - Balance. | |

6. The alloy of claim 3 consisting of, by weight:

| | |
|---|---|
| Cr | 20.22% |
| Mo | 5.3% |
| Si | 3.00% |
| C | 1.24% |
| B | 2.32% |
| Fe | 3.18% |
| Co | 13.16% |
| Ni and incidental impurities - Balance. | |

7. The alloy of claim 3 consisting of, by weight:

| | |
|---|---|
| Cr | 22.01% |
| Mo | 7.07% |
| Si | 2.60% |
| C | 1.41% |
| B | 2.03% |
| Fe | 2.80% |
| Co | 17.54% |
| Ni and incidental impurities - Balance. | |

8. The alloy of claim 3 consisting of, by weight:

| | |
|---|---|
| Cr | 16–22% |
| Mo | 1–7% |
| Si | 2.5–3.7% |
| C | 0.8–1.4% |
| B | 2–3% |
| Fe | 2–3.9% |
| Co | 4.3–17% |
| Ni | Balance. |

9. A nickel based hardfacing alloy having improved wear resistance consisting of, by weight:

| | |
|---|---|
| Cr | 16–22% |
| Mo | 1–7% |
| Si | 2.5–3.7% |
| C | 0.8–1.4% |
| B | 2–3% |
| Fe | 2–3.9% |
| Co | 4.3–17% |
| Ni | Balance | said alloy being in gas-atomized powder form suitable for deposition by plasma transferred arc welding and having a hardness in the range of about 50 Rc to 60 Rc, a coefficient of friction in the range of about 0.12 to 0.13, an ASTM G-65 wear rating in the range of about 20 to 26, and an ASTM G-77 wear rating in the range of about 0.0 to 0.074.

10. A plastic extruder screw comprising a metallic body having screw flights and a coating on the screw flights, said coating having a thickness between about 0.025 in. and about 0.5 in., and said coating further being Ni based and comprising between 4% and 18% Co by weight, between about 15% and 23% Cr by weight, between about 1% and 7% Mo by weight, and between 2% and 3% B by weight.

11. The plastic extruder screw of claim 10 wherein said coating has a thickness between about 0.025 in. and about 0.1 in.

* * * * *